United States Patent [19]

Gaborski et al.

[11] Patent Number: 5,299,269
[45] Date of Patent: Mar. 29, 1994

[54] CHARACTER SEGMENTATION USING AN ASSOCIATIVE MEMORY FOR OPTICAL CHARACTER RECOGNITION

[75] Inventors: Roger S. Gaborski; Lori L. Barski, both of Pittsford, N.Y.

[73] Assignee: Eastman Kodak Company, Rochester, N.Y.

[21] Appl. No.: 811,477

[22] Filed: Dec. 20, 1991

[51] Int. Cl.⁵ .............................................. G06K 9/34
[52] U.S. Cl. ........................................ 382/9; 382/14; 382/18; 382/36
[58] Field of Search ............... 382/14, 9, 36, 34, 18, 382/30, 15

[56] References Cited

U.S. PATENT DOCUMENTS

| | | | |
|---|---|---|---|
| 3,123,706 | 3/1964 | French | 235/61 |
| 3,221,158 | 11/1965 | Roth et al. | 235/164 |
| 3,543,296 | 11/1970 | Gardner et al. | 340/173 |
| 4,468,809 | 8/1984 | Grabowski et al. | 382/50 |
| 4,567,609 | 1/1986 | Metcalf | 382/9 |
| 4,570,181 | 2/1986 | Yamamura | 358/160 |
| 4,736,437 | 4/1988 | Sacks et al. | 382/34 |
| 4,797,940 | 1/1989 | Sato et al. | 382/9 |
| 4,817,179 | 3/1989 | Buck | 382/34 |
| 4,837,843 | 6/1989 | Owechko | 382/31 |
| 4,932,065 | 6/1990 | Feldgajer | 382/9 |
| 5,014,327 | 5/1991 | Potter et al. | 382/34 |
| 5,052,043 | 9/1991 | Gaborski | 382/27 |
| 5,058,180 | 10/1991 | Khan | 382/14 |
| 5,060,277 | 10/1991 | Bokser | 382/14 |
| 5,091,968 | 2/1992 | Higgins et al. | 382/16 |

Primary Examiner—Michael T. Razavi
Assistant Examiner—Steven P. Klocinski
Attorney, Agent, or Firm—Charles E. Wands; Dennis R. Arndt

[57] ABSTRACT

Character segmentation apparatus for an optical character recognition system for segmenting individual character images in an image of a document having many characters prior to performing character identification, including a movable kernel for capturing a sub-image framed within a window having an area corresponding to an area occupied by an individual character, the window being movable in the document image in pixel-by-pixel steps to capture a sub-image for each step of the window, an associative memory for responding to the captured sub-image by producing a corresponding one of a set of images of known characters with which the associative memory has been trained, and a sensor responsive to the behavior of the associative memory for determining whether the sub-image is the image of an individual character or a non-character.

32 Claims, 6 Drawing Sheets

CHARACTER SEGMENTATION USING AN ASSOCIATIVE MEMORY FOR OPTICAL CHARACTER RECOGNITION

BACKGROUND OF THE INVENTION

1. Technical Field

The invention is related to character segmentation performed in an optical character recognition system prior to character identification, and in particular to character segmentation employing an associative memory or neural network.

2. Background Art

The problem in optical character recognition of segmenting individual character images from one another in a bit-map image of a document prior to identifying the individual character images is well-known. In many cases, adjacent individual characters may actually appear to be joined, either because of overlapping or kerning or because of noise in the image. Character segmentation is an essential preparatory step for character identification to be carried out reliably.

While many techniques have been proposed for performing character segmentation, they are for the most part very complex. It would be a great advantage if one could simply step a movable window of a size corresponding to an individual character across a document image pixel-by-pixel and reliably determine for each position of the window whether or not it has captured an individual character. If so, the image captured within the window would be transmitted to a down-stream character identification device. Otherwise, the captured image would not be transmitted. Such a procedure would enjoy the significant advantage of simplicity. However, no way of implementing such a procedure reliably has been found.

For example, U.S. Pat. No. 4,932,065 to Feldgajer describes a technique (illustrated in FIGS. 1a and 1b herein) for segmenting characters 10, 12 (FIG. 1a) for optical character recognition using a movable examining window 14 (FIG. 1b) corresponding in size to a single character, and moving the window pixel-by-pixel through the entire bit-map image 16 of the document. At each step, the image captured inside the window 14 is processed to determine whether the image within the window corresponds to an individual character. However, the processing employed is not sufficiently reliable. Specifically, the contents of the image captured within the window 14 at each position thereof is multiplied pixel-by-pixel with respective elements of a kernel 18 identical in size to the movable window 14, and the sum of all products is used as a "score" to determine whether the current window position is centered on one of the known characters. The elements of the kernel 18 correspond to a probability for each pixel in the window whether that pixel is "on" whenever the window is centered over any one of the characters in a known character set. Thus, each kernel element is a probability density function across all characters in the known character set. The magnitude of the kernel elements or individual probability density functions is indicated within the kernel 18 of FIG. 1a by tone, the darker areas of the kernel 18 containing elements or probability density functions of higher amplitude. The kernel 18 is produced in a straightforward manner by totalling for each pixel in the movable window the number of times it is "on" as each character in the known character set is centered in the movable window, as depicted in FIG. 1a.

Such a technique is not reliable: The computation of the score is not particularly immune to "false" high scores attributable to portions of adjacent characters simultaneously captured within the window when the window is NOT centered over one individual character. Depending upon the character font, such a non-character captured image (i.e., an image straddling two adjacent characters) frequently may have a high correlation to many of the large amplitude elements in the mask of probability density functions, and thus produce a false "high" score, leading the system to the incorrect conclusion that the captured image is that of an individual character.

Depending upon its frequency of occurrence, such an error is unacceptable in commercially marketed optical character recognition systems. Thus, it has not seemed possible to reliably perform character segmentation by simply stepping an intelligent window or kernel across the bit-map image of a document. Accordingly, the art must currently turn to far more complex techniques for reliable character segmentation, a significant burden.

Therefore, it is an object of the present invention to provide a reliable process for segmenting characters by stepping a window or intelligent kernel pixel-by-pixel across the bit-map image of a document, thereby achieving simplicity without sacrificing reliability.

It is a further object of the invention to provide such a process with a strong immunity against falsely identifying portions of adjacent characters captured within the window at a given position as an individual character.

DISCLOSURE OF THE INVENTION

In accordance with the invention, the image captured at each pixel-by-pixel step within the movable window is processed by an associative memory or neural network which has been trained with knowledge of a complete training set of character images. The invention senses whether the associative memory or neural network associates the window's captured image with one of the characters of the training set. Typically, the associative memory or neural network is of the type which actually produces the correct character of the training set in response to a captured image centered on the corresponding character in the bit-map image of the document. In this case, the invention senses whether the associative memory or neural network actually produces one of the characters of the training set. If so, the captured image is immediately identified as being the image of a segmented or individual character, and it is transmitted on to a downstream character identifier.

In the preferred embodiment, immunity to falsely identifying a particular window position as being centered on a character is dramatically increased by training the neural network or associative memory with two sets of training images: (1) "character" images of the known character set, and (2) "non-character" images of all possible intersections and combinations of the known character set corresponding to window positions straddling adjacent characters. The latter set of training images necessarily includes the type of window-captured images which in the prior art led to false identification of a window position as being centered on a character —i.e., false character segmentation. In this preferred embodiment, the invention senses which one of the two sets of training images the captured image falls within. In other words, the invention classifies the character identified by the neural network or associative memory as being either within set (1) or set (2). Provided that all possible non-character images have been included in set (2), the invention provides virtually flawless character segmentation. Such reliability and immunity to failure was unattainable in the prior art.

In general, some types of associative memories or neural networks do not have the ability to classify their output as falling within one of two (or more types) of training sets with which the neural network or associative memory has been trained. In particular, the Hopfield neural network (FIGS. 2a and 2b) does not have the ability to so classify its output. It merely produces a member of a training set in response to an input. Thus, the only way to classify a captured image using this type of associative memory or neural network would be to try to recognize the character produced by the neural network, by using the character identifier of the downstream optical character recognition system. This would lead to an anomalous result whenever the output of the neural network or associative memory is a non-character (falling within training image set (2)), since the downstream character identifier would simply fail, which is just the situation that character segmentation is supposed to prevent.

The foregoing problem is overcome for such neural networks or associative memories by appending to each training image an extra pixel row or column outside the field of the movable window. Thus, if the movable window consists of m horizontal rows and n vertical columns of pixels, then each individual training image consists of m+1 rows and n columns of pixels, so as to provide an extra or m+1$^{st}$ pixel row, for example. The m+1$^{st}$ row contains a bit pattern classifying the image as a character (set 1) or a non-character (set 2). As the captured (unknown) image is transmitted from the movable window to the neural network, an extra row of all zeroes is added to it as the m+1$^{st}$ row so that its dimensionality corresponds to that of the neural network's training set. The neural network will then produce the corresponding training character image, including the extra row containing the correct classification of the unknown image captured within the current position of the movable window in the document image. The contents of the extra or m+1$^{st}$ row is included in the output image generated by the neural network and determines whether the captured image is to be transmitted to the downstream character identifier.

Another aspect of the invention is that it provides an improvement in that type of neural network or associative memory which, in the prior art, could not classify its output as falling within a certain one of two (or more) training sets with which the neural network or associative memory has been trained. The invention invests such a neural network or associative memory with the ability to internally classify its output as falling within a certain one of two (or more) training sets of inputs with which the neural network or associative memory has been trained. One example of this aspect of the invention is described in detail below with respect to a Hopfield neural network. Thus, the invention provides a significant advance in the field of neural networks and associative memories.

MODES FOR CARRYING OUT THE INVENTION

Figure 3:
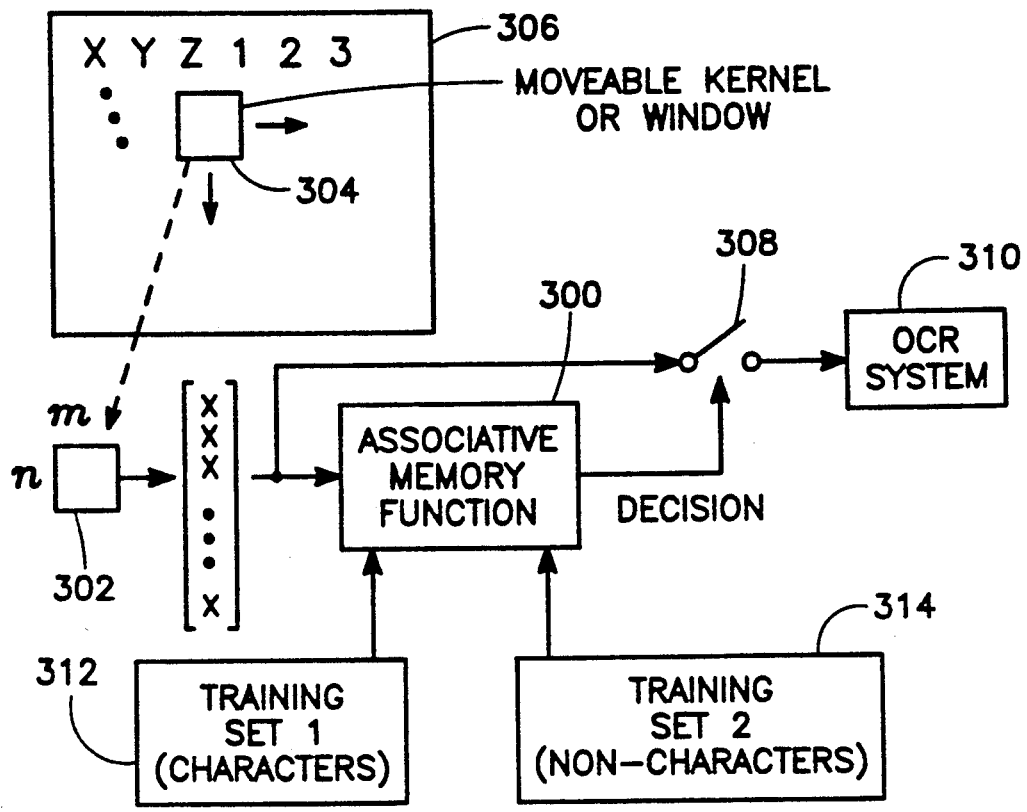
FIG. 3 is a simplified block diagram of a character segmenting system embodying the present invention.

Referring to FIG. 3, an associative memory function 300 receives a sub-image 302 captured within a movable window 304 in the bit-map image 306 of a document. The window 304 is moved to a succession of positions in the bit-map image 306 pixel-by-pixel to capture a succession of different sub-images, each of which is transmitted in turn to the associative memory function 300.

The associative memory function 300 has been trained with at least a set of training characters of the type expected to be found in the document represented by the bit-map image 306. If the associative memory function 300 can recall one of the training characters in response to the sub-image 302, then a controller 308 responds by forwarding the sub-image 302 to a downstream character identifier of an optical character recognition system 310.

Figure 4:
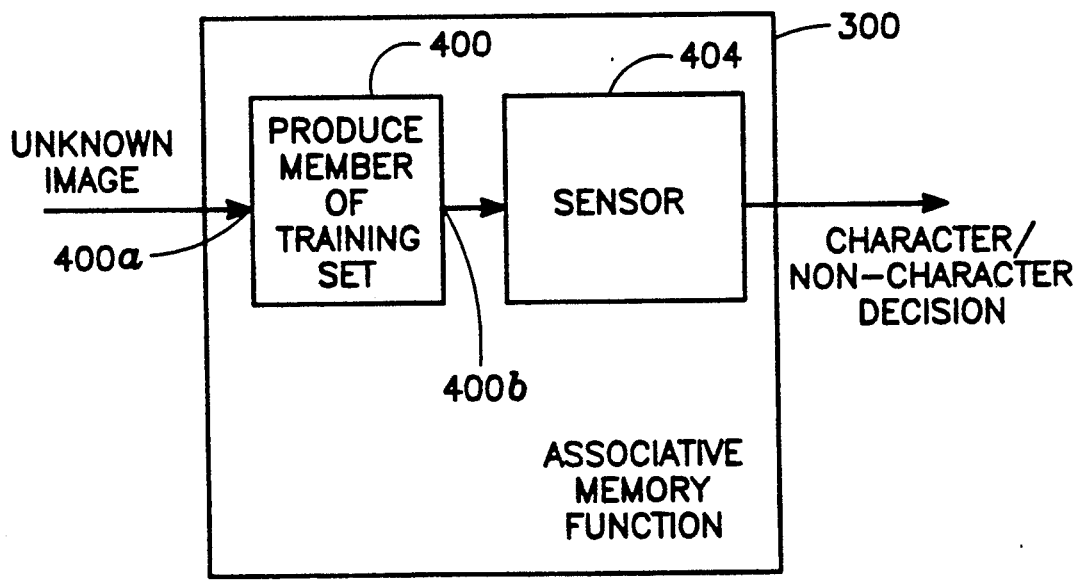
FIG. 4 is a block diagram of the associative memory function employed in system of FIG. 3 in accordance with the invention.

Referring to FIG. 4, the associative memory function 300 includes a neural function 400 reflecting the knowledge of a set of training vectors. The training vectors are formed from a complete set of characters appearing in the document. Each training image is obtained by centering the window 304 over a known character. If, for example, the size of the window 304 is m pixel rows and n pixel columns, then each training character image captured in the window 304 is converted to a single column vector having m×n elements. This process is performed for each character in the font in order to complete the training set. Any unknown image of m pixel rows and n pixel columns captured in the window 304 is similarly converted to vector form and applied to the neural function input 400a. If the captured image is one of an individual character (so that the window 304 is centered on one individual character in the bit-map image 306), the neural function 400 immediately produces the corresponding training vector at its output 400b. A detector 404 senses whether the neural function 400 has produced a training vector at its output 400b. If so, the detector 404 transmits a YES indication to the controller 308. Otherwise, a NO or NULL indication is transmitted to the controller 308.

A significant advantage of the invention is that it provides immunity against erroneous character segmentation. In the preferred embodiment, this is accomplished by training the associative memory function 300 of FIG. 3 with two different training vector sets 312, 314. The first training vector set 312 comprises a vector for each character in the font with which the document represented by the bit-map image 306 was printed. The second training vector set 314 comprises a vector for each possible "non-character" image which the window 304 might capture as a result of straddling two characters or otherwise being un-centered with respect to an individual character in the bit-map image 306. These non-character vectors of the second set 314 are formed in a manner similar to that described above with reference to the character training vectors of the first set 312, with the exception that during formation of the second set 314, the window 304 is not centered over a single character. Instead, the window 304 is moved to all other positions in the document image 306 (or at least many of the other positions) so that all possible non-character images (or at least many thereof) are included in the second training set 314. Thus, the associative memory function 300 will always find a corresponding training vector in response to any image captured by the window 304: either a character training vector from the first training set 312 or a non-character training vector from the second training set 314. As a result, there is no ambivalence in the character segmenting decision made at each position of the movable window 304. The vector produced by the associative memory function 300 will fall into one of the two types, thereby determining unambiguously whether the sub-image 302 is a character or non-character.

In an alternative embodiment of the invention, the emergent behavior of the associative memory function 300 is used to deduce whether the sub-image captured within the window 304 is a true character. In this alternative embodiment, the associative memory function 300 is trained with only the first (true character) training set. If a particular sub-image 302 captured in the window 304 is a true character, the associative memory function 300 will very quickly if not immediately produce the corresponding training vector. On the other hand, if the particular sub-image 302 is not a true character (because, for example, the window 304 is straddling two adjacent characters), then the emergent behavior of the associative memory function 300 will result in a much longer time being consumed (more computational iterations being performed) in attempting to arrive at a stable result. In this alternative embodiment, the time consumed by the associative memory function 300 (or the number of iterations performed thereby) is sensed by the detector 404 and controls the decision of whether the sub-image 302 represents a segmented character.

Figure 1A:
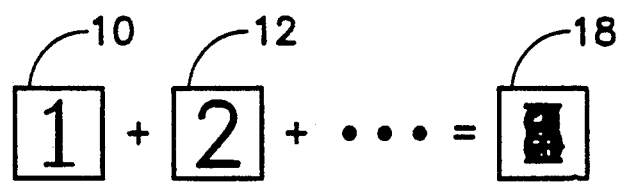
FIG. 1a is a simplified flow diagram depicting the construction of a probability density function kernel for use in character segmentation with a movable window, in accordance with the prior art.
Figure 1B:
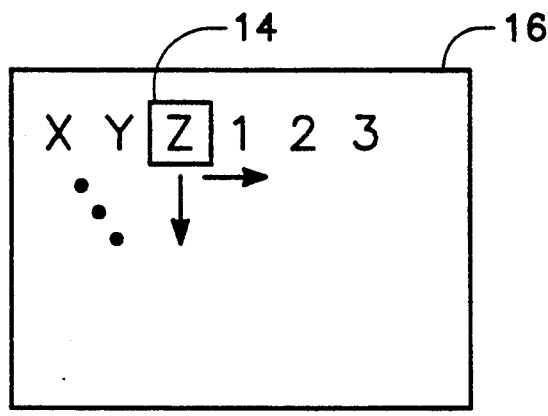
FIG. 1b is a diagram depicting the operation of the movable window with reference to the kernel of FIG. 1a in accordance with the prior art.
Figure 2A:
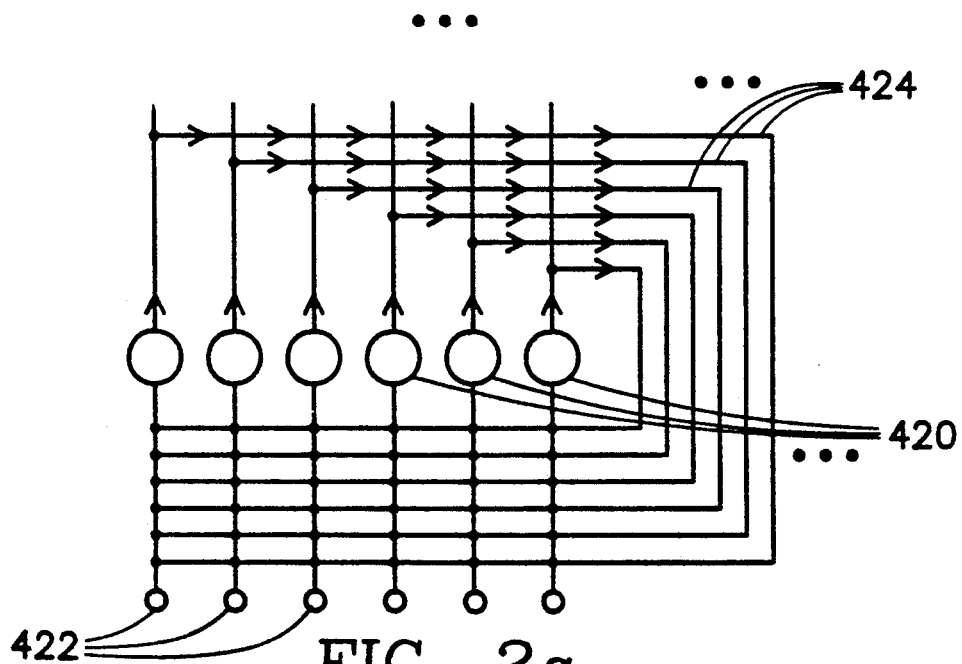
FIG. 2a is a diagram of a Hopfield neural network in accordance with the prior art.

The neural function 400 may be any suitable associative memory or neural network, such as the Hopfield neural network of FIG. 2a, for example. The Hopfield network of FIG. 2a has a set of neurons 420 connected to a respective set of input/output nodes 422 and a set of feedback connections 424 connecting the output of each individual neuron 420 to the inputs of all neurons 420. Each neuron represents a different coupling strength or weight. The ensemble of all weights represented by all the neurons 420 represents the knowledge of a training set. An input vector is applied to the nodes 422. The feedback connections 424 cause the neurons 420 to generate a new vector at the nodes 422, which through a subsequent feedback cycle generates yet another revision of the vector. Through emergent behavior, the vector generated at the nodes 422 undergoes successive changes until it stabilizes at a state at which it is identical with a corresponding training vector, although in infrequent cases of spurious recall the vector may not be identical with a training vector.

Figure 2B:
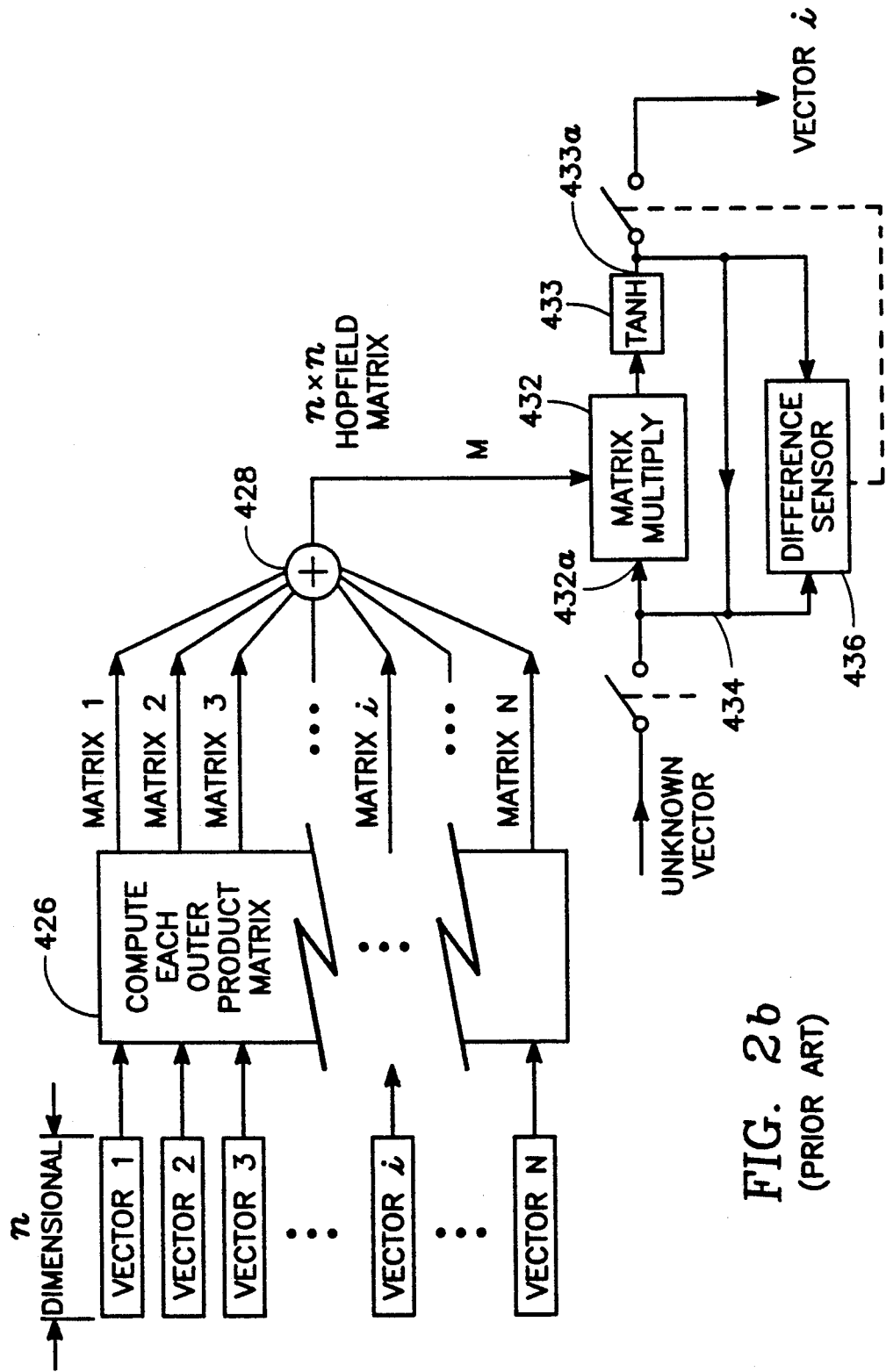
FIG. 2b is a diagram of a matrix implementation of the Hopfield network of FIG. 2a in accordance with the prior art

A matrix implementation of the foregoing is illustrated in FIG. 2b. N training vectors (Vector 1, Vector 2, ..., Vector N), such as column vectors each having $m \times n$ elements (corresponding to the number of pixels in the movable window 304), are applied successively to an outer product generator 426 which computes the outer product matrices, Matrix 1, Matrix 2, ..., Matrix N of the respective training vectors. The outer product matrix of a vector is one whose matrix element in the $i^{th}$ row and $j^{th}$ column is the product of the $i^{th}$ and $j^{th}$ elements of the vector. An adder 428 superimposes all of the outer product matrices together to produce a square Hopfield matrix M having $m \times n$ rows and $m \times n$ columns. A matrix multiplier 432 receives an unknown $m \times n$ element vector at its input 432a and multiplies it by the transformed Hopfield matrix M to produce a revised vector. An activation function 433 transforms the revised vector by taking the hyperbolic tangent (for example) of each element of the revised vector to produce a transformed vector at the output 433a of the activation function 433.

A difference sensor 436 determines whether the difference between the transformed vector at the activation function output 433a and the vector at the matrix multiplier input 432a exceeds a predetermined threshold (such as zero, for example). If so, the transformed vector at the activation function output 433a is fed back to the matrix multiplier input 432a via a feedback connection 434 to produce a new transformed vector at the activation function output 433a. The foregoing process is iteratively repeated as long as the difference sensed by the difference sensor 436 at the conclusion of each iteration exceeds the predetermined threshold. This iterative feedback process continues until the difference is less than the threshold. At this point, the vector at the activation function output 433a is one of the training vectors (e.g., Vector i), except in infrequent cases in which spurious recall occurs. The difference sensor 436 responds to the sensed difference being less than the predetermined threshold by permitting the vector at the activation function output 433a to be transmitted via a switch 438 as the final result.

To summarize thus far, in the preferred embodiment of the invention the neural network 400 is trained with two different training sets (namely, a character set and a non-character set), and the sensor 404 determines which set the produced vector belongs. In the alternative embodiment the neural network 400 is trained with a single training set (namely, the character set), and the sensor 404 counts the number of iterations performed by the neural network and compares this number with a predetermined threshold to determine whether the unknown image is a character. In yet another alternative embodiment not mentioned previously herein, the neural function 400 comprises two separate associative memories or neural networks, each one trained with a different one of the two training sets. The sensor 404 detects which one of the two associative memories required fewer iterations to reach a stable result, and classifies the unknown input image accordingly.

In the preferred embodiment, even if the Hopfield matrix M has been produced ("trained") with two different classes of training vectors (i.e., a set of vectors corresponding to all characters and a set of vectors corresponding to all possible non-characters), the Hopfield network of FIG. 2a and 2b cannot classify the output vector (e.g., Vector i) as such. It only produces a vector after a requisite number of iterations of the feedback loop 432a, 433a, 434 without indicating the training class to which the produced vector belongs.

Figure 5A:
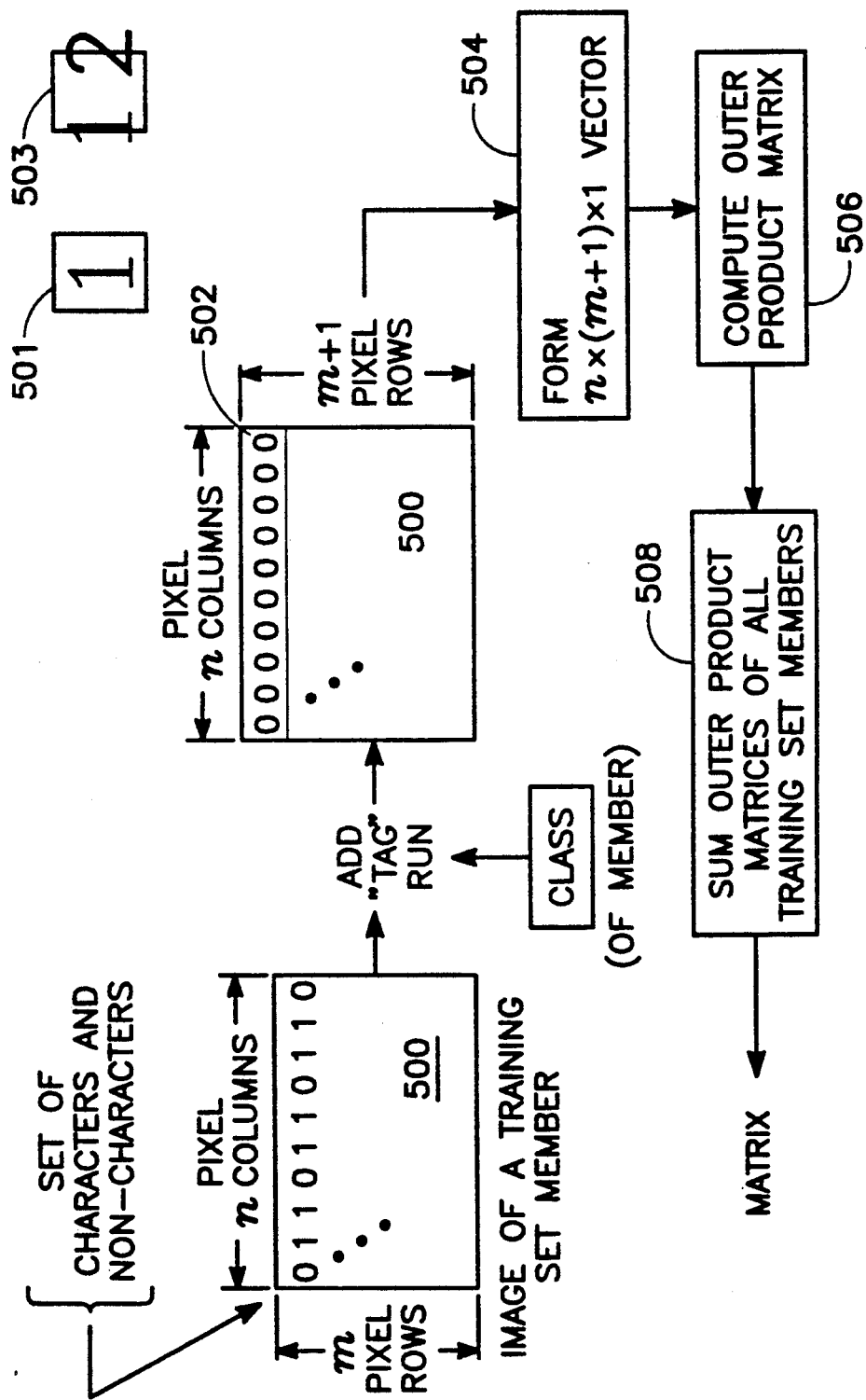
FIGS. 5a and 5b are schematic block diagrams of a preferred embodiment of the system of FIG. 3.
Figure 5B:
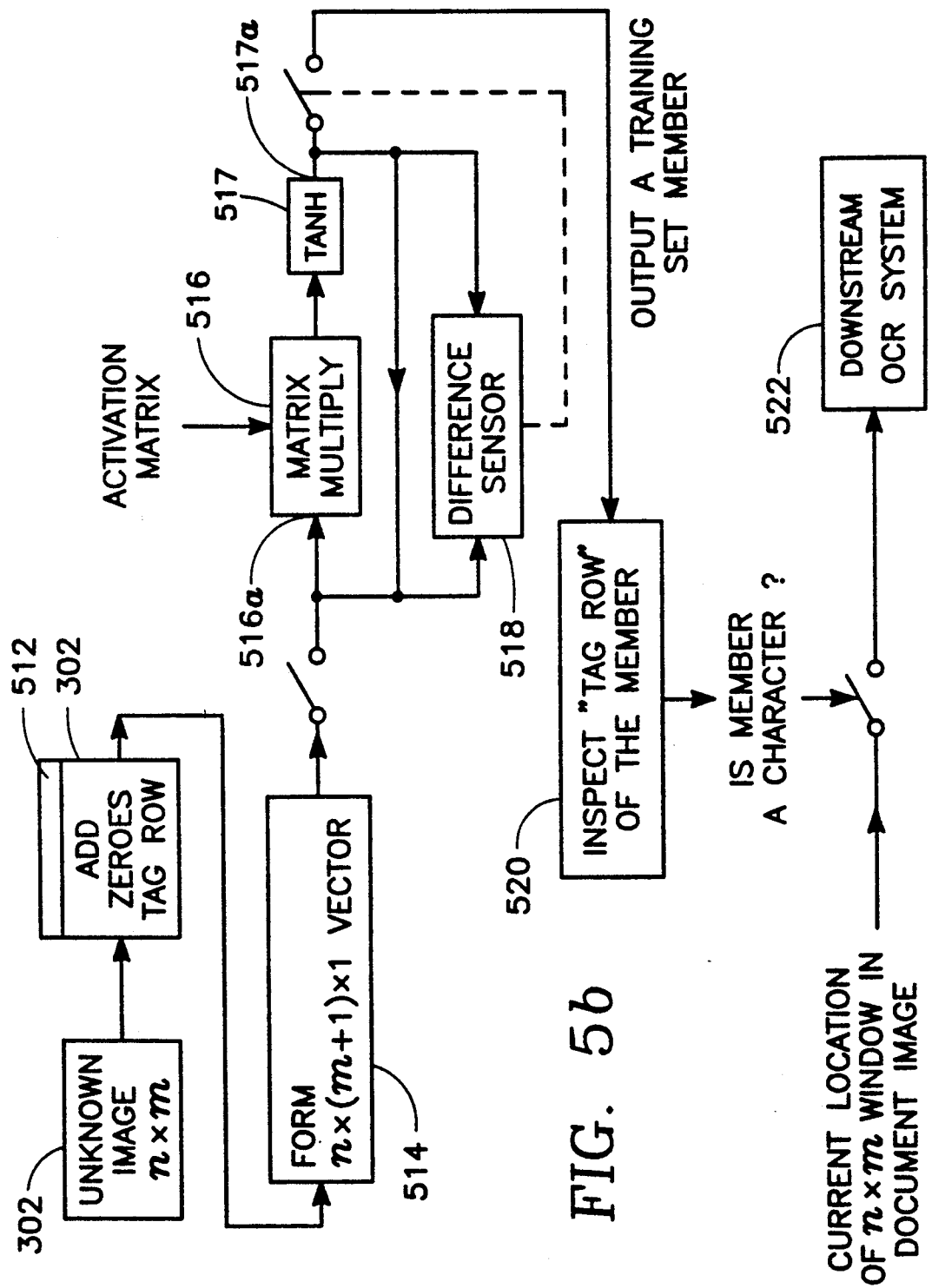

FIGS. 5a and 5b illustrate how the invention improves neural networks of the type having no classification ability, such as the Hopfield network, to provide within the neural network itself the internal capability of classifying an output vector as belonging to a particular one of two (or more) classes of training vectors with which the neural network has been trained. The training process for such an improved neural network will first be described.

Each one of a complete set of character images 501 (FIG. 5a) corresponding to sub-images 302 (FIG. 3) captured by the window 304 whenever it is centered over individual characters in the bit-map image 306 comprises a first training set of images. Each one of a complete set of non-character images 503 (FIG. 5a) corresponding to at least nearly all possible sub-images 302 which the window 304 may capture whenever it is not centered over a single character comprises a second "non-character" training set of images. Each of the images in the two training sets is taken as an individual image 500 (FIG. 5a) of some predetermined number of m pixel rows and n pixel columns, and is supplemented by an extra pixel row 502, to transform the image to an $m+1$ by n image. The bits in the extra row 502 reflect the training class of the vector. For example, if image 500 is that of a character, the extra row 502 consists of all binary ones, while if the image 500 is that of a non-character, then the extra row 502 consists of all zeros. Thus, the extra pixel row 502 is a "tag" row classifying the training vector as a character or a non-character. From the resulting $m+1$ by n image 500, 502, a column vector 504 having $n \times (m+1)$ elements is formed by placing all pixels in the $m+1$ by n image 500, 502 in a line in a predetermined order. (This predetermined order may be arbitrary but remains consistent throughout the remainder of this description.)

The outer product matrix 506 of the vector 504 is then computed by defining each element in the $i^{th}$ row and the $j^{th}$ column of the matrix 506 as the product of the $i^{th}$ and $j^{th}$ elements of the vector 504. The outer product matrix 506 consists of $(m+1) \times n$ rows and $(m+1) \times n$ columns of elements. The sum 508 of the outer product matrices corresponding to all training vectors is then obtained to generate a Hopfield matrix.

Referring now to FIG. 5b, during operation, each unknown sub-image 302 captured by the window 302 of FIG. 3 has m pixel rows and n pixel columns and is supplemented with an extra row of 512 zero bits or zero-valued pixels. The supplemented $m+1$ by n pixel image 302, 512 is then transformed to a column vector 514 of $(m+1) \times n$ elements in the manner described previously with reference to the column vector 504. A matrix multiplier 516 multiplies the vector 514 received at its input 516a by the Hopfield matrix M to produce a revised vector. An activation function 517 transforms the revised vector by taking the hyperbolic tangent of each element of the revised vector to produce a transformed vector at the activation function output 517a. A difference sensor 518 determines whether the difference between the vectors at the matrix multiplier input 516a and the activation function output 517a exceeds a predetermined threshold amount. If so, the vector at the activation function output 517a is fed back to the matrix multiplier input 516a to produce a next revised vector at the output 517a. This feedback process is iteratively repeated until an iteration is performed in which the difference sensor 518 senses a difference less than the threshold. At this point, the vector at the output 517a is one of the training vectors (except in infrequent cases of spurious recall), and the difference sensor 518 causes it to be transmitted as a final result. The next step is for an inspector device 520 to inspect the tag row 512 of the vector produced by the matrix multiplier 516 to determine whether the current position of the window 304 corresponds to a character or a non-character. If the tag row contents indicate a character, the current window location (or the current sub-image captured within the window) is transmitted to a downstream optical character recognition system 522.

As previously mentioned herein, in one alternative embodiment of the invention, the associative memory function 300 of FIG. 3 is trained with only the set of character images, and the conventional Hopfield network of FIG. 2b is employed as the neural function 400 of FIG. 4. In this embodiment, the sensor 404 of FIG. 4 simply counts the number of iterations in which the revised vector at the activation function output 433a of FIG. 2a is fed back to the matrix multiplier input 432a (i.e., the number of iterations in which the difference sensor detects a difference exceeding a threshold difference). For this purpose, the sensor 404 may be connected directly to the difference sensor 436 of FIG. 2b. In accordance with the emergent behavior properties of the neural network of FIG. 2b, if the number of such iterations exceeds a predetermined count (such as zero or one, for example), it is highly unlikely that the unknown image corresponds to any of the character training images, and therefore a "non-character" signal is transmitted by the sensor 404. Otherwise, a "character" signal is transmitted.

Figure 6:
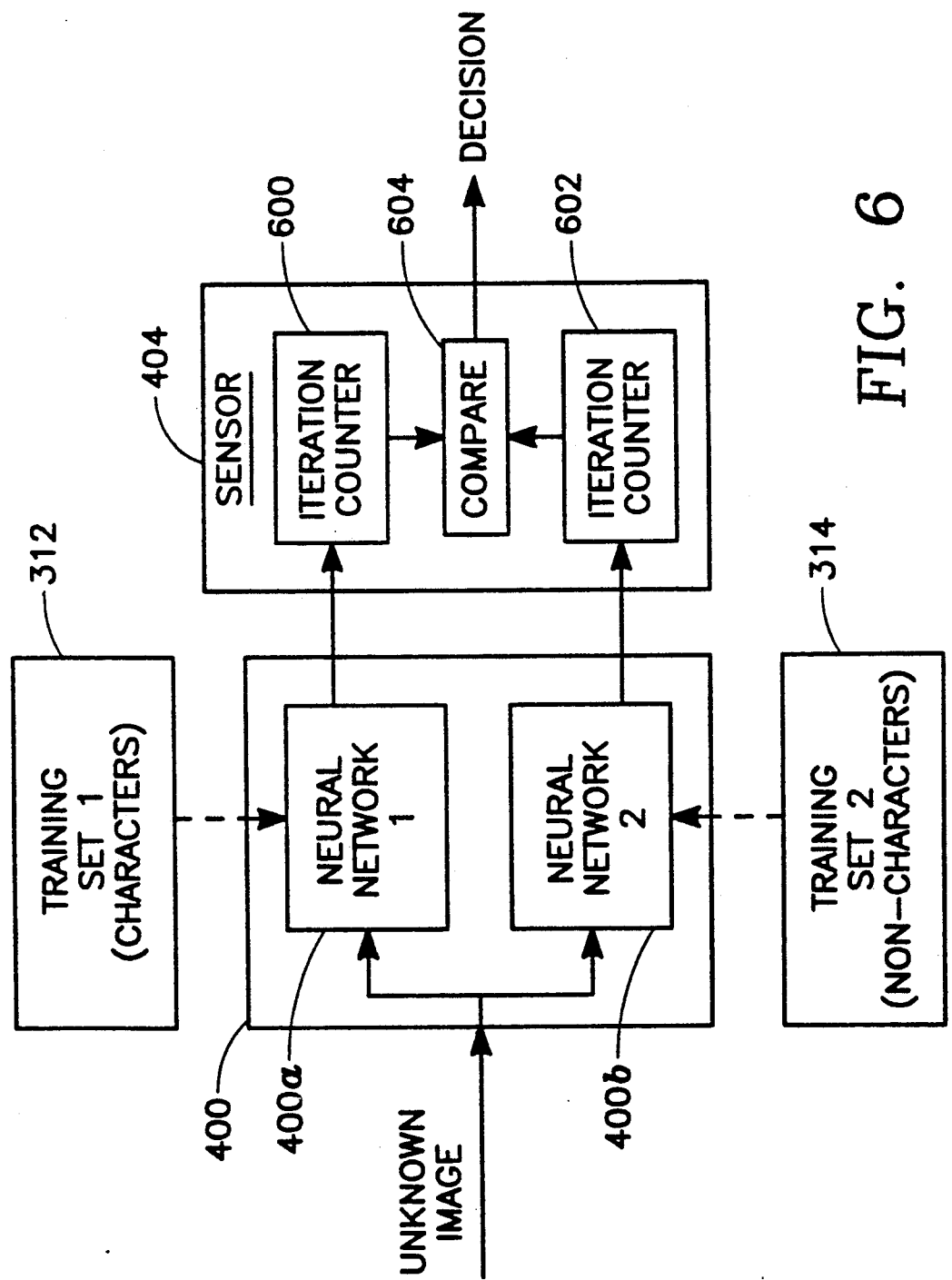
FIG. 6 is a simplified block diagram of an alternative embodiment of the associative memory function of FIG. 4.

In yet another embodiment of the invention illustrated in FIG. 6, the neural function 400 of FIG. 4 is actually two separate neural networks 400a, 400b each identical to the neural network of FIG. 2b. Each of the two neural networks 400a, 400b is trained with a respective one of the two training sets, 312, 314, namely the character training set and the non-character training set. The unknown image captured within the movable window 304 is transmitted to the inputs of both neural networks 400a, 400b. Simultaneously, each of the two neural networks attempts to match the unknown image with a member of its own training set. The sensor 404 includes a pair of iteration counters 600, 602 which count the number of iterations performed by respective ones of the two neural networks 400a, 400b. A compare device 604 determines which of the two counts is less, and classifies the unknown image accordingly. For example, if the neural network 400a which was trained with true characters performed less iterations in reaching a stable result than the neural network 400b trained with-non characters, then the unknown image would be classified by the compare device 604 as a true character.

The concept in FIG. 5 of adding "tag" information to each training image so as to invest the neural network with the internal capability of outputting the classification of a vector produced in response to an unknown input vector has wide applications across a broad spectrum of industrial uses including fields other than optical character recognition. In such applications, the number of classes may equal the number of training images or training vectors, so that each training vector is uniquely identified by its tag row, the tag row of each training image differing from the tag rows of all other training images. One application in the field of optical character recognition would be character identification in the downstream OCR system of FIG. 5b. Specifically, if there are 26 training images corresponding to the 26 letters of the alphabet, the tag row would comprise at least $\log_2 26$ binary bits (for example) and each training image's tag row would containing a binary bit pattern uniquely identifying that image as a specific one of the 26 letters of the alphabet. The identification function 520 would inspect the tag row of each image output by the neural network to determine the letter identification of the unknown image received by the network. In other applications requiring a vast number K of training images or vectors, more than one tag row could be used to provide at least $\log_2 K$ binary tag row bits.

While the invention has been described in detail by specific reference to preferred embodiments thereof, it is understood that variations and modifications may be made without departing from the true spirit and scope of the invention.

We claim:

1. Character segmentation apparatus for an optical character recognition system for segmenting individual character images in an image of a document comprising plural characters, prior to performing character identification, said image of a document comprising an array of pixels, said apparatus comprising:
   kernel means for capturing, in said image of a document, a sub-image framed within a window having an area corresponding to an area occupied by an individual character of said document, said window being movable in said image of a document in pixel-by-pixel steps whereby said kernel means captures a sub-image for each step of said window;
   associative memory means for responding to said sub-image by producing a corresponding one of a set of training images of known characters with which said associative memory has been trained; and
   sensor means, responsive to said associative memory means producing said corresponding one of a set of training images of known characters, for determining whether said sub-image is the image of an individual character, and segmenting said sub-image as an unidentified individual character image in response to said sub-image corresponding to the image of an individual character.

2. The character segmentation apparatus of claim 1 wherein:
   said associative memory means has been trained with said set training of images of known characters and in addition thereto has been trained with a set of training images of known non-characters corresponding to positions of said window framing more than a single one of said characters in said image of said document;
   each image in said set of training images of known characters and in said set of images of training known non-characters with which said associative memory has been trained comprises an image portion corresponding to the area of said window and a tag portion containing information identifying whether said image with which said associative memory has been trained belongs to said set of training images of known characters or belongs to said set of training images of known non-characters; and
   said sensor means comprises means for reading the tag portion of said image produced by said associative memory.

3. The apparatus of claim 2 wherein said window comprises m pixel rows and n pixel columns, said image portion of each image with which said associative memory has been trained comprises m pixel rows and n pixel columns and said tag portion comprises an extra $m+1^{st}$ row adjacent the $m^{th}$ row of said image portion, said tag portion comprising pixels having a predetermined pattern uniquely defining said image portion as being one of a character or a non-character.

4. The apparatus of claim 3 wherein said associative memory comprises an $(m+1)\times n$ by $(m+1)\times n$ matrix multiplier, said sub-image comprises m pixel rows and n pixel columns, said apparatus further comprising:
   means for converting each m by n pixel sub-image to a vector comprising $m\times n$ elements;
   means for matching the dimensionality of said vector to the dimensionality of said matrix multiplier by appending n additional elements to said vector corresponding to the location of said tag portion of each image with which said associative memory has been trained whereby to form an augmented vector, and for transmitting said augmented vector to said matrix multiplier for multiplication of said augmented vector by a reference vector.

5. The apparatus of claim 4 wherein each of said n additional elements has a zero value.

6. The apparatus of claim 1 wherein said associative memory means exhibits the emergent behavior in producing said corresponding image and wherein sensor means comprises means for determining from emergent behavior exhibited by said associative memory whether said sub-image is the image of one of said known characters.

7. The apparatus of claim 6 wherein:
   said associative memory means comprises:
      means for modifying said sub-image to produce a transformed sub-image which resembles one of said images with which said associative memory has been trained more closely than said sub-image;
      means for determining whether a difference between said sub-image and said transformed sub-image exceeds a predetermined threshold;
      means responsive to said means for determining for feeding back said transformed sub-image to said means for modifying whereby said transformed sub-image is modified to produce a next transformed sub-image, whereby said means for modifying produces an iterative series of transformed sub-images in a series of iterative repetitions until performing a repetition for which said difference does not exceed said predetermined threshold; and
   said sensor means comprises:
      means for counting the number of said iterative repetitions performed by said means for modifying and for comparing said number with a threshold count.

8. The apparatus of claim 7 wherein said means for modifying comprises:
   means for transforming said sub-image into a vector;
   means for multiplying said vector by a matrix whose elements each comprise a sum of corresponding elements of outer product matrices of a set of vectors corresponding to said set of images of known characters.

9. The apparatus of claim 8 wherein said window is characterized by m pixel rows and n pixel columns and wherein each vector comprises m×n elements, and wherein each of said matrices comprises m×n rows and n×m columns of matrix elements.

10. The apparatus of claim 1 wherein said associative memory means comprises first and second associative memories, said first associative memory trained with said set of training images of known characters and said second associative memory trained with a set of training images of non-characters corresponding to sub-images, captured in said window, of more than one character in said document, said apparatus further comprising means for transmitting said sub-image captured in said window to said first and second associative memories, said sensor means comprising means for comparing emergent behavior responses to said sub-image of said first and second associative memories.

11. The apparatus of claim 10 wherein:
each one of said first and second associative memories comprises:
means for modifying said sub-image to produce a transformed sub-image which resembles one of said images with which said each one of said associative memories has been trained more closely than said sub-image;
means for determining whether a difference between said sub-image and said transformed sub-image exceeds a predetermined threshold;
means responsive to said means for determining for feeding back said transformed sub-image to said means for modifying whereby said transformed sub-image is modified to produce a next transformed sub-image, whereby said means for modifying produces an iterative series of transformed sub-images in a series of iterative repetitions until performing a repetition for which said difference does not exceed said predetermined threshold; and
said sensor means comprises:
means for counting the number of said iterative repetitions performed by said means for modifying and for comparing said number with a threshold count.

12. The apparatus of claim 11 wherein said means for modifying comprises:
means for transforming said sub-image into a vector;
means for multiplying said vector by a matrix, whose elements each comprise a sum of corresponding elements of outer product matrices of a set of vectors, corresponding to one of said set of training images of known characters or said set of training images of non-characters.

13. A character segmentation method in optical character recognition for segmenting individual character images in an image of a document comprising plural characters in preparation for performing character identification, said image of a document comprising an array of pixels, said method comprising:
capturing, in said image of a document, a sub-image framed within a window having an area corresponding to an area occupied by an individual character of said document, said window being movable in said image of a document in pixel-by-pixel steps whereby a sub-image is captured for each step of said window;
responding to said sub-image by producing a corresponding one of a set of training images of known characters;
determining from results of said producing step whether said sub-image is the image of an individual character; and
in response to said determining step determining that said sub-image is the image of an individual character, segmenting such sub-image as an unidentified individual character image.

14. The character segmentation method of claim 13 wherein:
wherein said set of training images includes a first set of images of known characters and a second set of images of known non-characters corresponding to positions of said window framing more than a single one of said characters in said image of said document;
each training image in said set of images of known characters and in said set of known non-characters comprises an image portion corresponding to the area of said window and a tag portion containing information classifying said training image as belonging to one of said first and second sets of images;
said determining step comprises reading the tag portion of said training image.

15. The method of claim 14 wherein said window comprises m pixel rows and n pixel columns, said image portion of each training image comprises m pixel rows and n pixel columns and said tag portion comprises an extra $m+1st$ row adjacent the $m^{th}$ row of said image portion, said tag portion comprising pixels having a predetermined pattern uniquely defining said image portion as being one of a character or a non-character.

16. The method of claim 15 wherein said producing step comprises transforming said sub-image with an $(m+1)\times n$ by $(m+1)\times n$ matrix, said sub-image comprises m pixel rows and n pixel columns, said method further comprising:
converting each m by n pixel sub-image to a vector comprising m×n elements;
matching the dimensionality of said vector to the dimensionality of said matrix by appending n additional elements to said vector corresponding to the location of said tag portion in each of said training images whereby to form an augmented vector, and multiplying said augmented vector by a reference vector.

17. The method of claim 16 wherein each of said n additional elements has a zero value.

18. The method of claim 13 wherein said producing step exhibits emergent behavior in producing said corresponding training image and wherein said determining step comprises determining from emergent behavior exhibited by said producing step whether said sub-image is the training image of one of said known characters.

19. The method of claim 18 wherein:
said producing step comprises:
treating said sub-image as an input image and modifying said input image to produce an output image which resembles one of said training images more closely than said input image;

deciding whether a difference between said input an output images exceeds a predetermined threshold;

in response to said deciding step, feeding back said output image as a next input image and repeating said modifying step to produce a next output image and then repeating said deciding step with said next input and output images, whereby an iterative series of repetitions of said modifying and deciding steps are performed until a repetition is performed for which said difference does not exceed said predetermined threshold; and said determining step comprises:

counting the number of said iterative repetitions of said modifying step and comparing said number with a threshold count.

20. The method of claim 19 wherein said modifying step comprises:

transforming said image into a vector;

multiplying said vector by a matrix whose elements each comprise a sum of corresponding elements of outer product matrices of a set of vectors corresponding to said set of training images of known characters.

21. The method of claim 20 wherein said window is characterized by m pixel rows and n pixel columns and wherein each vector comprises $m \times n$ elements, and wherein said matrices comprises $m \times n$ rows and $n \times m$ columns of matrix elements.

22. The method of claim 13 wherein said producing step comprises transmitting said sub-image to a pair of associative memories trained, respectively, with said set of training images of known characters and a set of training images of non-characters corresponding to sub-images captured in said window of more than one character in said document, and said determining step comprises comparing emergent behavior responses of said pair of trained associative memories.

23. The method of claim 22 wherein:

said producing step further comprises performing the following steps in each one of said pair of associative memories:

modifying said sub-image to produce a transformed sub-image which resembles one of said images with which said one associative memory has been trained more closely than said sub-image;

determining whether a difference between said sub-image and said transformed sub-image exceeds a predetermined threshold;

in response to said determining step, feeding back said transformed sub-image to said modifying step whereby said transformed sub-image is modified to produce a next transformed sub-image, whereby an iterative series of repetitions of said modifying step is performed until a repetition is performed for which said difference does not exceed said predetermined threshold; and said determining step further comprises:

counting the number of said iterative repetitions of said modifying step and comparing said number with a threshold count.

24. the method of claim 23 wherein said modifying step comprises:

transforming said sub-image into a vector;

multiplying said vector by a matrix, whose elements each comprise a sum of corresponding elements of outer product matrices of a set of vectors, corresponding to one of said set of training images of known characters or said set of training images of non-characters.

25. An associative memory with an internal capability of classifying its output as falling into one of a plurality of different sets of training vectors, representative of respective sets of characters and non-characters, with which said associative memory has been trained comprising:

means for receiving an $m \times n$ element input vector corresponding to an m-by-n input data array;

means for producing one of a plurality of training vectors which most closely resembles said input vector, said training vectors each comprising an information portion comprising $m \times n$ elements corresponding to an m-by-n data array and an n element tag portion corresponding to an $m+1^{st}$ row of data not included in said data array, said tag portion being operative to identify said each training vector as a member of a set of training vectors representative of characters or a set of training vectors representative of non-characters.

26. The associative memory of claim 25 further comprising means for reading the tag portion of the training vector produced by said means for producing.

27. The associative memory of claim 25 wherein said means for producing comprise:

means for converting said input vector to an $(m+1) \times n$ element vector by appending n elements to said input vector in a location thereof corresponding to the location of the tag portions of said training vectors to produce an augmented input vector;

means for multiplying said augmented input vector received at an input thereof by a $(m+1) \times n$ by $(m+1) \times n$ element matrix whose elements each comprise the sum of corresponding elements of $(m+1) \times n$ by $(m+1) \times n$ element outer product matrices of each one of said $(m+1) \times n$ element training vectors, whereby to produce an output vector at an output thereof;

means for feeding back the output vector produced at the output of said means for multiplying to said input of said means for multiplying to produce another output vector whenever the difference between the vector at said input and output of said means for multiplying exceeds a predetermined threshold, and for outputting the most recent output vector produced at said output of said means for multiplying otherwise.

28. An associative memory with an internal capability of classifying its output as falling into one of a plurality of classes, comprising:

means for receiving an input vector;

trained neural network means for producing one of a plurality of vectors with which the neural network has been previously trained, which one vector most closely resembles said input vector, by performing an operation which is repeatable until one of said plurality of vectors is produced; and means responsive to the number of times said operation is repeated for determining whether said one vector falls within a predetermined class.

29. The associative memory of claim 28 wherein said neural network means comprise two neural networks each trained to produce a vector most closely resembling said input vector from a respective one of two sets of training vectors corresponding to two classes of training vectors by performing repeatable operations, and wherein said means for determining compares the number of repetitions of said operations by said two neural networks in response to the same input vector.

30. The associative memory of claim 28 wherein said repeatable operation comprises multiplying said input vector by a matrix whose elements each comprise a sum of corresponding elements of the outer product matrices of all of said training vectors.

31. The associative memory of claim 25 wherein each one of said training vectors has a unique data pattern in its tag row.

32. The associative memory of claim 31 wherein each training vector corresponds to an image of an individual character and the data pattern in the tag row thereof uniquely identifies the individual character to which the training vector corresponds.

* * * * *